United States Patent
Ichikawa

(10) Patent No.: US 8,744,503 B2
(45) Date of Patent: Jun. 3, 2014

(54) WIRELESS COMMUNICATION DEVICE, WIRELESS COMMUNICATION SYSTEM, AND WIRELESS COMMUNICATION METHOD

(75) Inventor: Masaki Ichikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/514,706

(22) PCT Filed: Nov. 30, 2010

(86) PCT No.: PCT/JP2010/071335
§ 371 (c)(1),
(2), (4) Date: Jun. 8, 2012

(87) PCT Pub. No.: WO2011/077905
PCT Pub. Date: Jun. 30, 2011

(65) Prior Publication Data
US 2012/0252376 A1    Oct. 4, 2012

(30) Foreign Application Priority Data
Dec. 24, 2009    (JP) .................................. 2009-292528

(51) Int. Cl.
*H04B 7/00* (2006.01)

(52) U.S. Cl.
USPC ............................ 455/500; 455/102; 375/260

(58) Field of Classification Search
USPC .................. 455/422.1, 501, 91, 95, 102–103, 455/108–110, 115.1, 500; 375/260, 265, 375/267
See application file for complete search history.

(56) References Cited

U.S. PATENT DOCUMENTS

| | | | |
|---|---|---|---|
| 6,891,897 B1 * | 5/2005 | Bevan et al. ................... | 375/265 |
| 7,734,303 B2 * | 6/2010 | Krishnamoorthi et al. ... | 455/501 |
| 2008/0069263 A1 * | 3/2008 | Murakami et al. ............ | 375/267 |
| 2009/0185577 A1 | 7/2009 | Kishiyama et al. | |

FOREIGN PATENT DOCUMENTS

| | | |
|---|---|---|
| JP | 10-41876 | 2/1998 |
| JP | 2002-237797 | 8/2002 |
| JP | 2004-364321 | 12/2004 |
| JP | 2006-191701 | 7/2006 |
| JP | 2006-333356 | 12/2006 |

(Continued)

OTHER PUBLICATIONS

International Search Report, PCT/JP2010/071335, Mar. 15, 2011.

(Continued)

*Primary Examiner* — Thanh Le
(74) *Attorney, Agent, or Firm* — Young & Thompson

(57) ABSTRACT

A wireless communication device avoids unnecessary reduction of transmission capacity of a data signal to ensure the reliability of a pilot signal. A determination unit determines a reception modulation method for a received data signal according to the state of the transmission line. A transmission circuit generates a first pilot signal indicating the reception modulation method determined by the determination unit and, after adding an error correction code, modulates and transmits the first pilot signal. A reception unit receives a second pilot signal indicating a transmission modulation method that is the method for modulating a transmitted data signal. A switching unit, in accordance with the transmission modulation method indicated by the second pilot signal received by the reception unit, switches at least one of the modulation method of the first pilot signal transmitted by the transmission circuit and the redundancy of the error correction code of the first pilot signal.

13 Claims, 7 Drawing Sheets

(56) References Cited

FOREIGN PATENT DOCUMENTS

| | | |
|---|---|---|
| JP | 2007-312060 | 11/2007 |
| JP | 2008-536378 | 9/2008 |
| JP | 2009-506583 | 2/2009 |
| JP | 2009-273183 | 11/2009 |

OTHER PUBLICATIONS

JP Office Action dated Oct. 22, 2013, with English Translation; Application No. 2011-547428.

* cited by examiner

WIRELESS COMMUNICATION DEVICE, WIRELESS COMMUNICATION SYSTEM, AND WIRELESS COMMUNICATION METHOD

TECHNICAL FIELD

The present invention relates to a wireless communication device that uses an adaptive modulation method to carry out wireless communication.

BACKGROUND ART

With the development of broadband communication technology in wireless communication systems such as a digital microwave wireless communication system, improved of the transmission capacity (transmission throughput) of data signals is being sought. One technology that enables an improvement of transmission capacity adopts multivalued modulation of data signals to increase the number of bits per symbol of a modulated signal in which a data signal has been modulated and thus raises the efficiency of the use of frequency. Symbols are the units of modulated signals that can be transmitted at one time, and the number of bits per symbol of a modulated signal is referred to as the modulation multivalue number.

When modulation is multivalued, however, the phase and amplitude of each symbol of the modulated signal approach each other and the modulated signal becomes more prone to influence from the state of the transmission line. As a result, when the state of the transmission line is poor, the error rate of the modulated signal increases, resulting in a still further decrease of the transmission capacity of the modulated signal.

As a solution to the above-described problem, recent years have witnessed the use of an adaptive modulation method that adaptively switches the method of modulating data signals according to the state of the transmission line. In an adaptive modulation method, a modulation method in which the modulation multivalue number is small is used when the state of the transmission line is poor, and a modulation method in which the modulation multivalue number is large is used when the state of the transmission line is good. As a result, a modulation method that is appropriate to the state of the transmission line can be used, and the transmission capacity of the data signal can be improved.

In the adaptive modulation method, a wireless device in the wireless communication system transmits, in addition to the data signal, a pilot signal that indicates the modulation method of the data signal that is received from the wireless device of the communication destination. The wireless device of the communication destination transmits a data signal that is modulated by the modulation method indicated by this pilot signal. In this way, synchronization of the modulation methods can be established between wireless devices even if the modulation method of the data signal changes, whereby the data signals can be demodulated.

Nevertheless, when an error occurs in the pilot signal, synchronization of the modulation methods cannot be achieved, resulting in the potential inability to demodulate the data signals. As a result, not only is the pilot signal given an error correction code having even greater redundancy than the data signal, but the pilot signal is also modulated by a modulation method in which the modulation multivalue number is relatively small, whereby the modulation method is less prone to influence from the state of the transmission line. For example, the pilot signal is modulated by QPSK (Quadrature Phase Shift Keying), which is a modulation method having a modulation multivalue number of "2."

In addition, a wireless device must estimate the amplitude and phase of a data signal in order to demodulate the data signal. Because a pilot signal does not include information relating to the amplitude and phase of this data signal, a pseudo-pilot signal that is separate from the pilot signal may also be transmitted to improve the accuracy of estimating the amplitude and phase of the data signal.

For example, the data transmitter described in Patent Document 1 converts a predetermined symbol in the data signal to a pseudo-pilot signal that indicates the amplitude and phase of the data signal and then transmits. The method of modulation of the pseudo-pilot signal is determined such that it has a modulation multivalue number that is no greater than the modulation multivalue number of the data signal. In addition, if the modulation multivalue number of the modulation method of the pseudo-pilot signal is no greater than the modulation multivalue number of the modulation method of the data signal, the modulation method of the pseudo-pilot signal may also be fixed and may also change together with time.

LITERATURE OF THE PRIOR ART

Patent Documents

Patent Document 1: Japanese Unexamined Patent Application Publication (Translation of PCT Application) No. 2008-536378

SUMMARY OF THE INVENTION

Problem to be Solved by the Invention

When a modulation method having a relatively small modulation multivalue number is used, and moreover, an error correction code of greater redundancy than that of the data signal is provided in order to ensure the reliability of the pilot signal, the transmission time of the pilot signal is increased and the transmission capacity of the data signal consequently decreases.

In the adaptive modulation technology of the prior art, the modulation method of the pilot signal and the redundancy of the error correction code of the pilot signal are fixed. As a result, the transmission time of the pilot signal is fixed regardless of the state of the transmission line. However, when the state of the transmission line is good, the reliability of the pilot signal can be ensured even if the modulation multivalue number of the modulation method of the pilot signal is increased or even if the redundancy of the error correction code of the pilot signal is decreased to decrease the transmission time of the pilot signal. Accordingly, there is a problem exists in the adaptive modulation technology of the prior art in which the transmission time of the pilot signal consumes more time than is necessary and the transmission capacity of the data signal is decreased more than necessary to ensure the reliability of the pilot signal.

In the data transmitter described in Patent Document 1, the modulation method of the pseudo-pilot signal changes together with time, whereby the modulation multivalue number of the modulation method of the pseudo-pilot signal increases, resulting in a shortening of the transmission time of the pseudo-pilot signal. However, the actual method of changing the modulation method of the pseudo-pilot signal is not described, and merely changing the pilot signal over time similar to the pseudo-pilot signal does not restrain decreasing the transmission capacity of the data signal more than necessary. There is a further possibility that the reliability of the pilot signal cannot be maintained.

It is an object of the present invention to provide a wireless communication device, a wireless communication system, and a wireless communication method that can solve the above-described problem in which, the transmission capacity of the data signal is decreased more than is necessary in order to ensure the reliability of the pilot signal.

Means for Solving the Problem

The wireless communication device according to the present invention is a wireless communication device that uses adaptive modulation method that switches the modulation method of modulating a data signal according to the state of the transmission line to carry out wireless communication and includes: determination means that determines the reception modulation method that is the modulation method of modulating the received data signal that is received from another wireless communication device according to the state of the transmission line; transmission means that generates a first pilot signal that indicates the reception modulation method that was determined in the determination means, and that, after adding an error correction code, modulates and then transmits the first pilot signal; reception means that receives a second pilot signal that indicates the transmission modulation method that is the modulation method of modulating the transmitted data signal that is transmitted to another wireless communication device; and switching means that, according to the transmission modulation method indicated by the second pilot signal that was received by the reception means, switches at least one of the modulation method of modulating the first pilot signal that was transmitted by the transmission means and the redundancy of the error correction code of the first pilot signal.

The wireless communication system according to the present invention is provided with a plurality of the wireless communication devices and switches the modulation method used in communication between the wireless communication devices according to the state of the transmission line between the wireless communication devices.

The wireless communication method according to the present invention is a wireless communication method realized by a wireless communication device that uses adaptive modulation method that switches the modulation method of a data signal according to the state of the transmission line to carry out wireless communication and includes:

a determination step of, according to the state of the transmission line, determining the reception modulation method that is the modulation method of a received data signal that is received from another wireless communication device;

a transmission step of generating a first pilot signal that indicates the reception modulation method that was determined, after first adding an error correction code, modulating and then transmitting the first pilot signal;

a reception step of receiving a second pilot signal that indicates the transmission modulation method that is the modulation method of the transmitted data signal that is transmitted to another wireless communication device; and a switching step of, according to the transmission modulation method that is indicated by the second pilot signal that was received, switching at least one of the modulation method of the first pilot signal and the redundancy of the error correction code of the first pilot signal.

Effect of the Invention

The present invention enables that the transmission capacity of the data signal is not decreased more than is necessary in order to ensure the reliability of the pilot signal.

CARRYING OUT THE INVENTION

Exemplary embodiments of the present invention are next described with reference to the accompanying drawings. In the following explanation, constituent elements having the same functions are given identical reference numbers and redundant explanation of these elements may be omitted.

Figure 1:
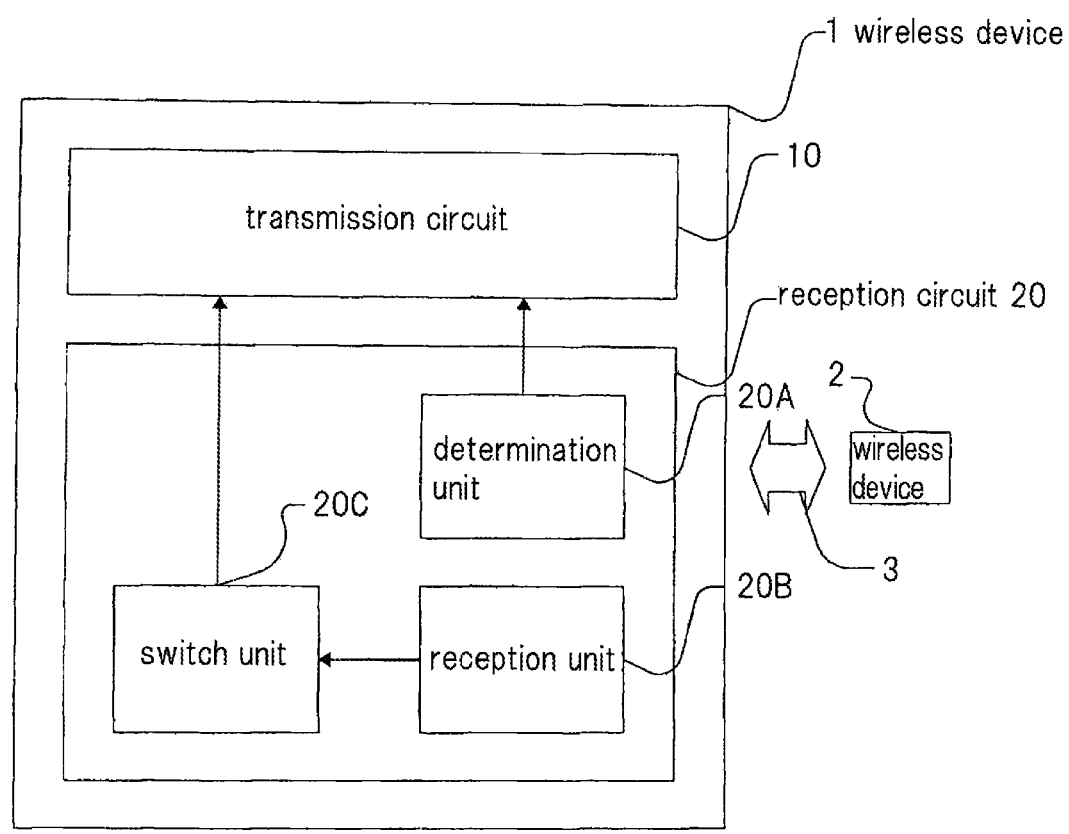
FIG. 1 is a block diagram showing the configuration of the wireless communication device of the first exemplary embodiment of the present invention.

FIG. 1 is a block diagram showing the configuration of the first exemplary embodiment of the present invention. In FIG. 1, wireless device 1 includes transmission circuit 10 and reception circuit 20. In addition, reception circuit 20 includes determination unit 20A, reception unit 20B, and switch unit 20C.

Wireless device 1 is a wireless communication device that is used in a wireless communication system such as a digital microwave wireless communication system, and uses an adaptive modulation method in which the method of modulating a data signal is switched according to the state of the transmission line to carry out wireless communication with another wireless communication device.

Wireless device 1 determines the method of modulating a received data signal that is received from another wireless communication device and notifies the other wireless communication device of the modulation method that was determined by using a pilot signal to establish synchronization of the methods of modulating of the received data signal with the other wireless communication device. In addition, the other wireless communication device is assumed to be wireless device 2 having the same functions as wireless device 1, but may be a wireless communication device that uses an adaptive modulation method to transmit a pilot signal.

Transmission circuit 10 is also referred to as transmission means. Transmission circuit 10 generates a first pilot signal that indicates the reception modulation method that is the method of modulating the received data signal that wireless device 1 receives from wireless device 2, and after adding an error correction code, modulates and transmits the first pilot signal.

Determination unit 20A is also referred to as determination means. Determination unit 20A measures the state of transmission line 3 that is the wireless transmission line between wireless devices 1 and 2, and determines the reception modulation method according to the state of transmission line 3 that was measured. Transmission circuit 10 further generates first pilot signal that indicates the reception modulation method that was determined in determination unit 20A.

Reception unit 20B is also referred to as reception means. Reception unit 20B receives from wireless device 2 a second pilot signal that indicates the transmission modulation method that is the method of modulating the transmitted data signal that wireless device 1 transmits to wireless device 2.

Switch unit 20C is also referred to as switch means. Switch unit 20C switches at least one of the modulation method of the first pilot signal that transmission circuit 10 transmits and the redundancy of the error correction code of the first pilot signal according to the transmission modulation method that is indicated by the second pilot signal that reception unit 20B receives.

According to the present exemplary embodiment, determination unit 20A determines the reception modulation method of modulating the received data signal according to the state of transmission line 3. Transmission circuit 10 generates the first pilot signal that indicates the reception modulation method that was determined in determination unit 20A and, after adding an error correction code, modulates and transmits the first pilot signal. Reception unit 20B receives the second pilot signal that indicates the transmission modulation method that is the method of modulating the transmitted data signal. Switch unit 20C switches at least one of the modulation method of the first pilot signal that transmission circuit 10 transmits and the redundancy of the error correction code of the first pilot signal according to the transmission modulation method that is indicated by the second pilot signal received by reception unit 20B.

In this case, at least one of the redundancy and modulation method of the first pilot signal is adjusted according to the transmission modulation method of the transmitted data signal.

Alternatively, the transmission modulation method may reflect the state of transmission line 3. To this end, at least one of the redundancy and the modulation method of the first pilot signal can be adjusted according to the state of transmission line 3. Accordingly, the redundancy and the modulation multivalue number of the modulation method of the first pilot signal can be made a value that is necessary and sufficient for ensuring the reliability of the pilot signal, whereby the transmission time of the pilot signal is not longer than is necessary and a reduction in the transmission capacity of the data signal is not grater than necessary.

The second exemplary embodiment of the present invention is next described.

Figure 2:
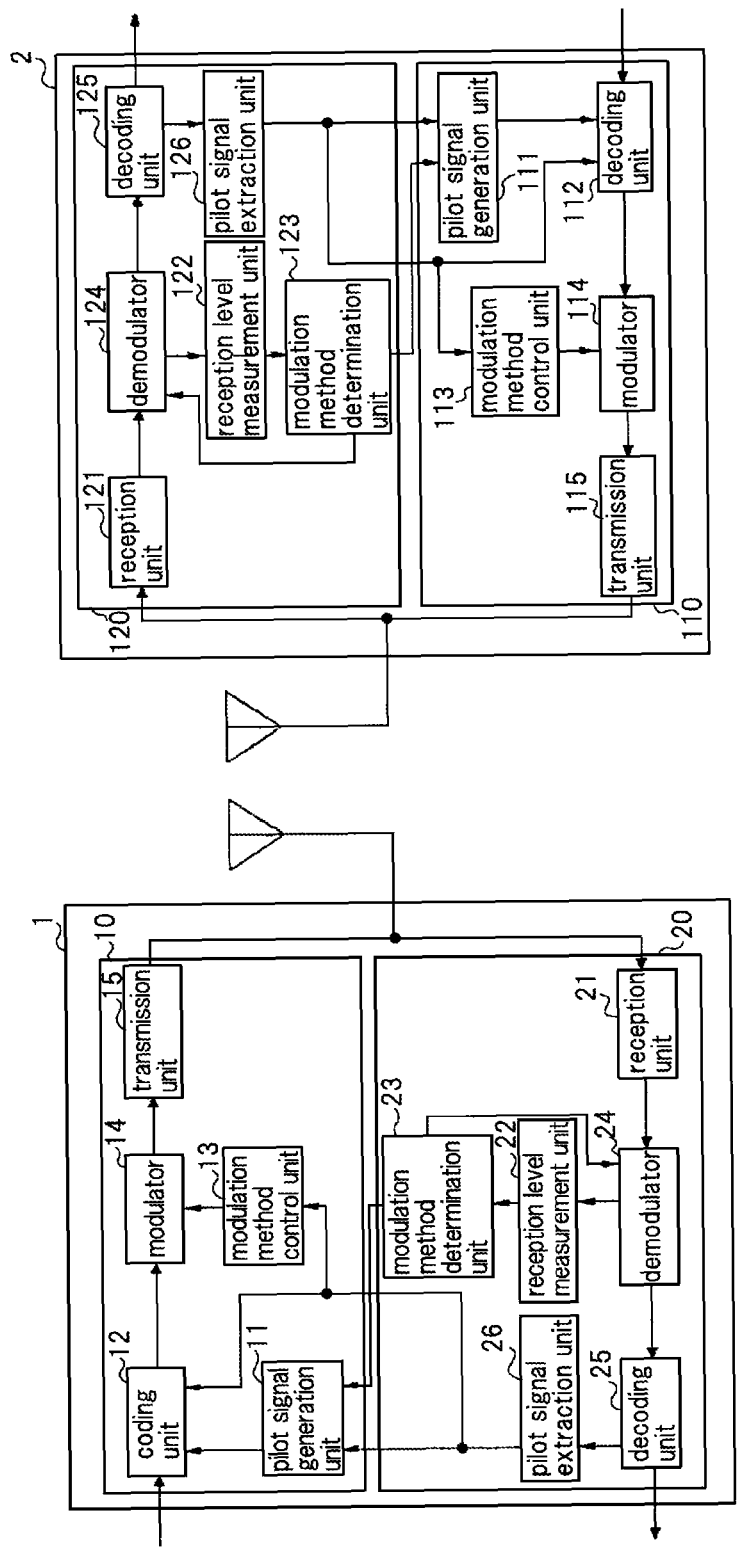
FIG. 2 is a block diagram showing the configuration of the wireless communication device of the second exemplary embodiment of the present invention.

FIG. 2 is a block diagram showing the digital microwave wireless communication system of the present exemplary embodiment. In FIG. 2, the digital microwave wireless communication system (hereinbelow referred to as a wireless communication system) includes wireless devices 1 and 2.

Wireless device 1 includes transmission circuit 10 and reception circuit 20.

Transmission circuit 10 includes pilot signal generation unit 11, coding unit 12, modulation method control unit 13, modulator 14, and transmission unit 15. Reception circuit 20 includes reception unit 21, reception level measurement unit 22, modulation method determination unit 23, demodulator 24, decoding unit 25, and pilot signal extraction unit 26.

Pilot signal generation unit 11 generates a first pilot signal that indicates the reception modulation method of modulating a received data signal. The reception modulation method is determined in modulation method determination unit 23, to be described. In addition, an error correction code has already been added to the first pilot signal that is generated by pilot signal generation unit 11. A more detailed description of pilot signal generation unit 11 is given hereinbelow.

A transmitted data signal is applied as input to coding unit 12. An error correction code has already been added to the transmitted data signal.

Coding unit 12 multiplexes the transmitted data signal that was received as input and the first pilot signal that was generated by pilot signal generation unit 11 and supplies the result as a transmitted frame signal. A more detailed description of coding unit 12 is given hereinbelow.

Modulation method control unit 13 sets the modulation method of the transmitted frame signal to modulator 14 according to the transmission modulation method that is indicated by the second pilot signal that was demodulated in pilot signal extraction unit 26 that is described hereinbelow.

More specifically, modulation method control unit 13, in accordance with the transmission modulation method, dynamically sets the modulation method of the transmitted frame signal in demodulator 24 such that the transmitted data signal in the transmitted frame signal is modulated by the transmission modulation method and the first pilot signal in the transmitted frame signal is modulated by the modulation method that was fixed in advance. The modulation method of the first pilot signal is assumed to be QPSK in the present exemplary embodiment.

Modulator 14 uses the modulation method that was set in modulation method control unit 13 to modulate the transmitted frame signal that was generated in coding unit 12.

Transmission unit 15 transmits the transmitted frame signal that was modulated in modulator 14 as the transmitted wireless signal to wireless device 2.

Reception unit 21 corresponds to reception unit 20B shown in FIG. 1. Reception unit 21 receives the wireless signal from wireless device 2 as a received frame signal. In the received frame signal, the second pilot signal and received data signal are multiplexed. In addition, each of the second pilot signal and the received data signal are modulated. Wireless device 2 has the same functions as wireless device 1, and the modulation method of the second pilot signal is therefore fixed in advance to QPSK identical to the first pilot signal.

Reception level measurement unit 22 and modulation method determination unit 23 make up determination unit 20A shown in FIG. 1.

Reception level measurement unit 22 measures the reception level of the received frame signal that is received by reception unit 21 and measures the state of the transmission line between wireless devices 1 and 2 based on this reception level. The state of the transmission line is represented by, for example, the C/N ratio (Carrier to Noise ratio).

Modulation method determination unit 23 determines the reception modulation method of the received data signal according to the state of the transmission line that was measured in reception level measurement unit 22. For example, modulation method determination unit 23 determines the reception modulation method from among modulation methods such as QPSK, 16QAM, 64 QAM, and 256 QAM that have been prepared in advance such that the modulation multivalue number increases correspondingly with better states of the transmission line.

Modulation method determination unit 23 reports to pilot signal generation unit 11 reception modulation information that indicates the reception modulation method that was determined and causes pilot signal generation unit 11 to generate a first pilot signal that indicates the reception modulation method that was determined by modulation method determination unit 23.

Demodulator 24 demodulates the received frame signal that was received by reception unit 21 according to the reception modulation method that was determined in modulation method determination unit 23.

Decoding unit 25 decodes the received frame signal that was demodulated by demodulator 24 and supplies the result as output.

Pilot signal extraction unit 26 corresponds to switch unit 20C that was shown in FIG. 1. Pilot signal extraction unit 26 extracts the second pilot signal from the received frame signal that was decoded by decoding unit 25. Pilot signal extraction unit 26 reports transmission modulation information that indicates the transmission modulation method that is indicated in this second pilot signal to pilot signal generation unit 11, coding unit 12, and modulation method control unit 13, thereby switching at least one of the modulation method of the first pilot signal and the redundancy of the error correction code of the first pilot signal according to the transmission modulation method.

In the present exemplary embodiment, the modulation method of the first pilot signal is fixed as described hereinabove, and pilot signal extraction unit 26 therefore is assumed to switch the redundancy of the error correction code.

Wireless device 2 includes transmission circuit 110 and reception circuit 120. Transmission circuit 110 includes pilot signal generation unit 111, coding unit 112, modulation method control unit 113, modulator 114, and transmission unit 115. Reception unit 120 includes reception unit 121, reception level measurement unit 122, modulation method determination unit 123, demodulator 124, decoding unit 125, and pilot signal extraction unit 126. Each part of wireless device 2 has the same function as the function of each part of the same name of wireless device 1.

The provision of the configuration as described hereinabove in a wireless communication system enables the independent switching of the modulation method of a data signal that is transmitted from wireless device 1 to wireless device 2 and the modulation method of modulating a data signal that is transmitted from wireless device 2 to wireless device 1.

The configuration of pilot signal generation unit 11 and coding unit 12 are next described in greater detail.

Figure 3:
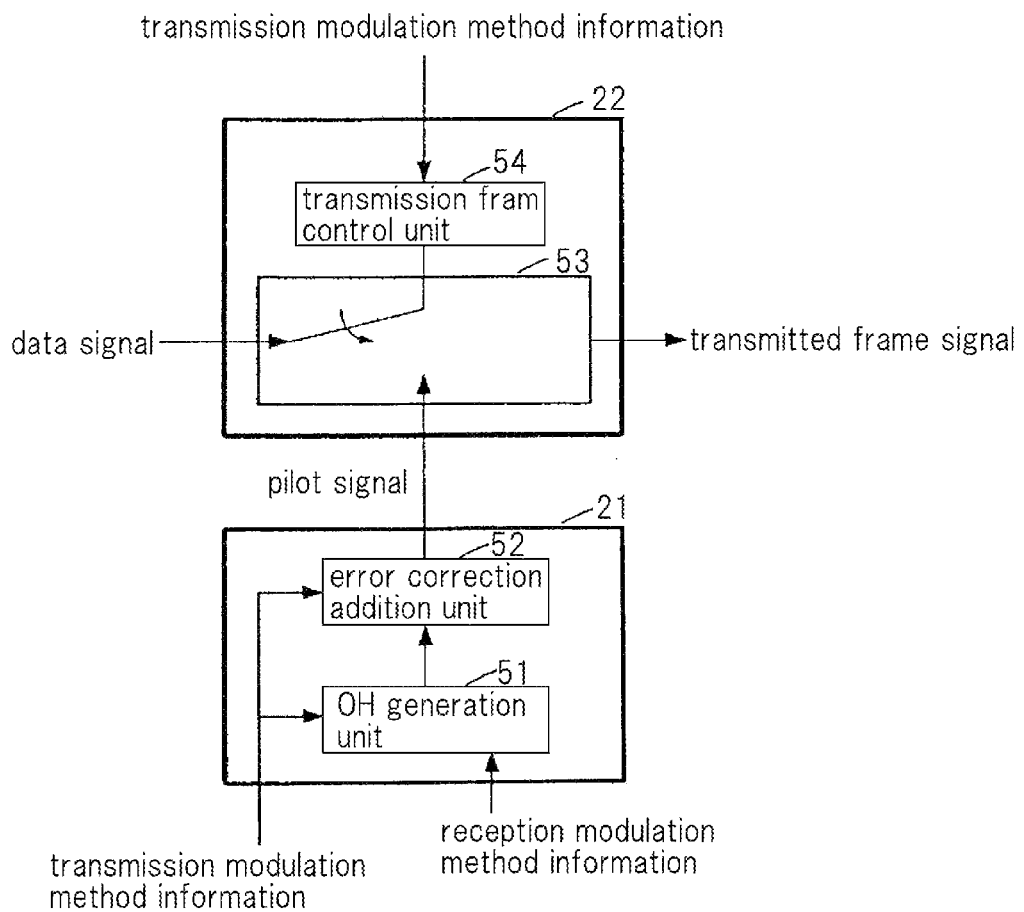
FIG. 3 is a block diagram showing an example of the configuration of the pilot signal generation unit and coding unit.

FIG. 3 is a block diagram showing an example of the configuration of pilot signal generation unit 11 and coding unit 12. In FIG. 3, pilot signal generation unit 11 includes OH generation unit 51 and error correction addition unit 52. In addition, coding unit 12 includes switch 53 and transmission frame control unit 54.

OH generation unit 51 periodically receives the reception modulation information from modulation method determination unit 23 and receives transmission modulation information from pilot signal extraction unit 26.

OH generation unit 51 generates an overhead signal of the transmitted frame signal based on the reception modulation information and transmission modulation information that were received.

The overhead signal is also the first pilot signal to which the error correction code has not been added. In addition, the overhead signal indicates not only the reception modulation method indicated by the reception modulation information but also the switching timing of the transmitted data signal and first pilot signal in the transmitted frame signal. In addition, the overhead signal may further indicate, for example, the reception level that was measured by reception level measurement unit 22.

Error correction addition unit 52 receives the transmission modulation information from pilot signal extraction unit 26, and according to the transmission modulation method that is indicated by the transmission modulation information, adds the error correction code to the overhead signal that is generated by OH generation unit 51 to generate the first pilot signal that has redundancy.

At this time, error correction addition unit 52 reduces the number of bits of the error correction code in proportion to the magnitude of the modulation multivalue number of the transmission modulation method to lower the redundancy of the error correction code of the first pilot signal. Accordingly, by reporting the transmission modulation information, pilot signal extraction unit 26 lowers the redundancy of the error correction code of the first pilot signal in proportion to the magnitude of the modulation multivalue number of the transmission modulation method.

When the redundancy of the error correction code of the first pilot signal changes, the switching timing of the first pilot signal and the transmitted data signal in the transmitted frame signal changes. As a result, OH generation unit 51 must judge the switch timing together with change in redundancy. This can be realized by the sharing by OH generation unit 51 and error correction addition unit 52 of a look-up table that shows the relation between the modulation multivalue number of the transmission modulation method and the redundancy of the first pilot signal.

Switch 53 selects either the transmitted data signal or the first pilot signal that was generated by error correction addition unit 52 and supplies the result as the transmitted frame signal to modulator 14.

Transmission frame control unit 54 receives the transmission modulation information from pilot signal extraction unit 26, and based on the transmission modulation method shown by the transmission modulation information, switches the signal that is selected by switch 53 to supply the transmitted frame signal from switch 53 as a signal in which the transmitted data signal and the first pilot signal are multiplexed.

The redundancy of the error correction code changes in accordance with the modulation multivalue number of the reception modulation method, and the data length of the first pilot signal therefore also changes. As a result, transmitted frame signal control unit 54 must adjust the output time of the first pilot signal in accordance with the modulation multivalue number of the reception modulation method. This can be realized by the sharing of the above-described look-up table by transmission frame control unit 54 with OH generation unit 51 and error correction addition unit 52.

The operations are next described.

The operations of the entire communication system are described hereinbelow, following which the operations of pilot signal generation unit 11 and coding unit 12 are described in detail.

Figure 4:
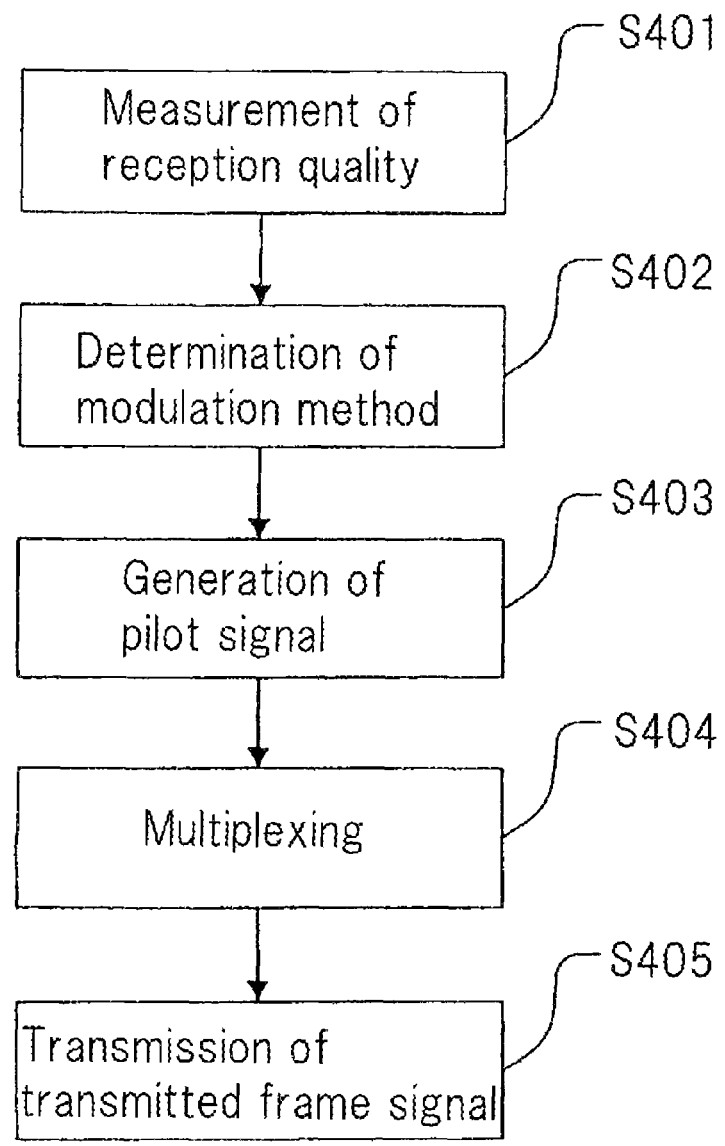
FIG. 4 is a flow chart for describing an example of the operations of the wireless communication device.

FIG. 4 is a flow chart for describing the operations of the entire communication system. Wireless device 1 of the present exemplary embodiment determines the modulation method of data signals that are transmitted by wireless device 2 based on the wireless signals that are received from wireless device 2, and operations are therefore described from the time of receiving a wireless signal.

Reception unit 21 of wireless device 1 executes Step S401 upon receiving a wireless signal as a received frame signal.

In Step S401, reception unit 21 transmits the received frame signal by way of demodulator 24 to reception level measurement unit 22. Upon receiving the received frame signal, reception level measurement unit 22 measures the reception level of the received frame signal and, based on the reception level, measures the state of the transmission line between wireless devices 1 and 2. Reception level measurement unit 22 transmits the state of the transmission line that was measured to modulation method determination unit 23. Upon receiving the state of the transmission line, modulation method determination unit 23 executes Step S402.

In Step S402, modulation method determination unit 23 determines the transmission modulation method of the transmitted data signal that is to be transmitted from wireless device 1 to wireless device 2 according to the state of the transmission line, and reports reception modulation information that indicates this transmission modulation method to pilot signal generation unit 11 and demodulator 24.

Upon notification of the reception modulation information, demodulator 24 demodulates the received frame signal that was received by reception unit 21 according to the reception modulation method that is indicated by the reception modulation information and transmits the result to decoding unit 25. Upon receiving the received frame signal, decoding unit 25 decodes this received frame signal and supplies the result to outside reception circuit 20 and pilot signal extraction unit 26.

Upon receiving the received frame signal, pilot signal extraction unit 26 extracts the second pilot signal from the received frame signal and generates transmission modulation information that indicates the transmission modulation method that is indicated by the second pilot signal. Pilot signal extraction unit 26 reports the transmission modulation information that was generated to pilot signal generation unit 11, coding unit 12, and modulation method control unit 13.

Pilot signal generation unit 11, having received the transmission modulation information and reception modulation information, executes Step S403.

In Step S403, pilot signal generation unit 11 generates an overhead signal according to the transmission modulation method that is indicated in the reception modulation information, and adds error correction code, which has redundancy that accords with the transmission modulation method indicated by the transmission modulation information, to the overhead signal to generate the first pilot signal. Pilot signal generation unit 11 transmits the first pilot signal to coding unit 112 and then executes Step S404.

In Step S404, coding unit 12 multiplexes the first pilot signal and the transmitted data signal according to the transmission modulation information that was received from pilot signal generation unit 26 and transmits the result as a transmitted frame signal to modulator 14. Upon receiving the transmitted frame signal, modulator 14 executes Step S405.

In Step S405, modulator 14 modulates the transmitted frame signal by the modulation method that is set in modulator 14 and transmits the result to transmission unit 15.

In addition, modulation method control unit 13 receives the transmission modulation information from pilot signal extraction unit 26 and, in accordance with the transmission modulation information, sets a modulation method in modulator 14 such that the transmitted data signal in the transmitted frame signal is modulated by the transmission modulation method and the first pilot signal in the transmitted frame signal is modulated by the modulation method that was fixed in advance. These operations are possible because modulation method control unit 13 shares the look-up table held by OH generation unit 51.

Transmission unit 15, upon receiving the transmitted frame signal, sends the transmitted frame signal to wireless device 2 as a wireless signal.

Operations identical to those described hereinabove are also carried out in wireless device 2, whereby wireless devices 1 and 2 are each able to independently measure reception levels and independently set the modulation method of modulating transmitted data signals and received data signals.

The operations of pilot signal generation unit 11 and coding unit 12 are next described in greater detail. These operations are critical for raising the transmission capacity of the data signal.

In pilot signal generation unit 11, OH generation unit 51 generates an overhead signal that indicates the reception modulation method that is indicated in the reception modulation information that is received from modulation method determination unit 23. Pilot signal generation unit 11 reads from the look-up table the redundancy that corresponds to the transmission modulation method that is indicated by the transmission modulation information that was received from pilot signal extraction unit 26 and in accordance with this redundancy, specifies the switching timing of the transmitted data signal and first pilot signal in the transmitted frame signal and adds it to the overhead signal. Pilot signal generation unit 11 transmits this overhead signal to error correction addition unit 52.

Error correction addition unit 52, having received the overhead signal, reads from the look-up table the redundancy that corresponds to the transmission modulation method indicated by the transmission modulation information that was supplied from pilot signal extraction unit 26 and adds the error correction code of this redundancy to the overhead signal. Error correction addition unit 52 then transmits the overhead signal as a pilot signal to coding unit 12.

In coding unit 12, transmission frame control unit 54 carries out switching of switch 53 based on the transmission modulation information that was sent from pilot signal extraction unit 26 and multiplexes the data signal and pilot signal to transmit the data signal and pilot signal as a transmitted frame signal to modulator 14.

As described hereinabove, in the present exemplary embodiment, pilot signal extraction unit 26 lowers redundancy in proportion to the magnitude of the modulation multivalue number of the transmission modulation method, and as a result, the present exemplary embodiment exhibits the effects of both ensuring the reliability of the first pilot signal and allowing an increase in the transmission capacity of the transmitted data signal when the modulation multivalue number of the transmission modulation method is large.

The effects are next described.

Figure 5:
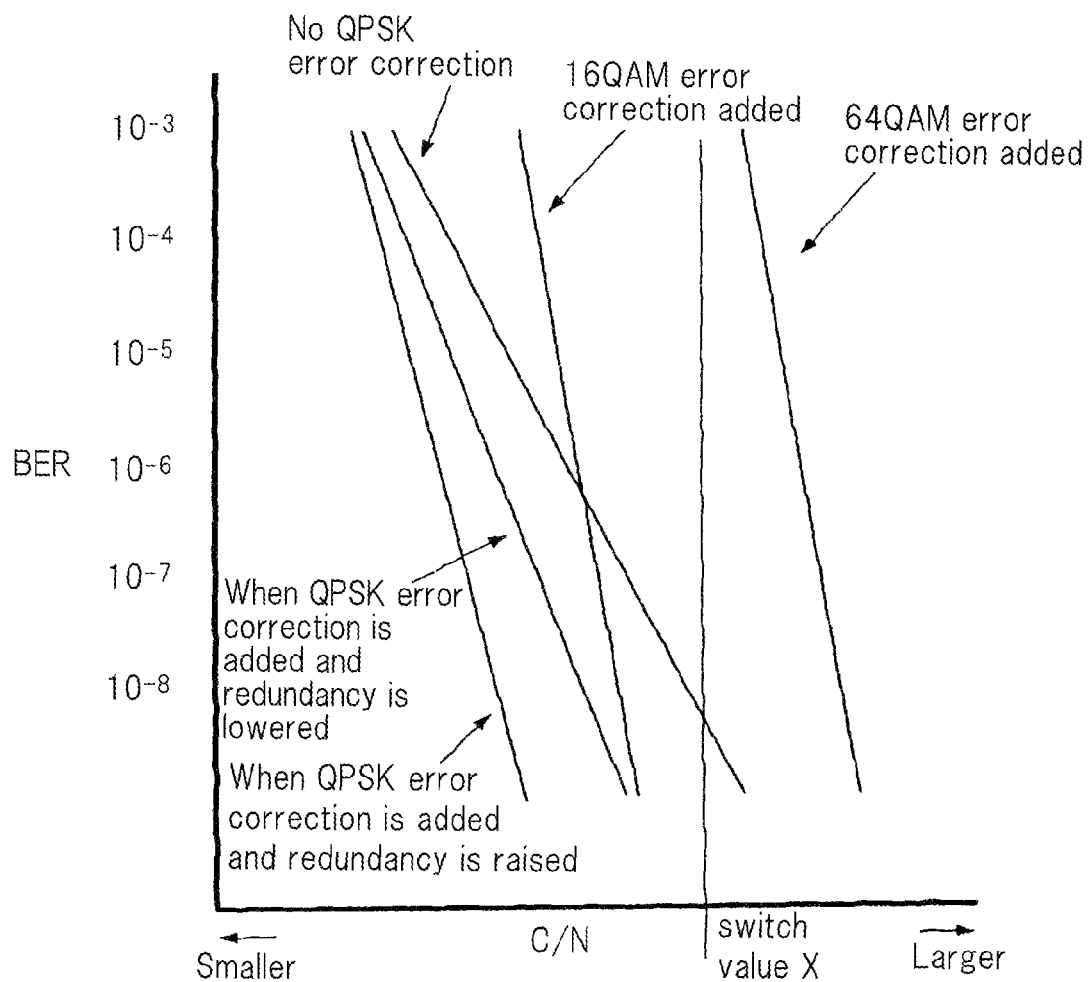
FIG. 5 is an explanatory view for describing the relation between the modulation method of a data signal and the redundancy of a pilot signal.

FIG. 5 is an explanatory view for describing the relation between the transmission modulation method and the redundancy of the error correction code of the pilot signal. FIG. 5 shows the relation between the C/N ratio for a wireless signal that is transmitted on a wireless transmission line and the bit error rate (BER) of a wireless signal for each modulation method and redundancy method. The figure shows that the state of a transmission line improves as the C/N ratio increases.

As the modulation methods, FIG. 5 shows QPSK that is the modulation method of the pilot signal and 16QAM and 64QAM that are the modulation methods of the data signal. The modulation multivalue number of QPSK is "2," the modulation multivalue number of 16QAM is "4," and the modulation multivalue number of 64QAM is "6." In addition, because the state of a transmission line improves as the C/N ratio increases, the modulation method of a data signal is 64QAM when the C/N ratio is relatively high, and 16QAM when the C/N ratio is relatively low.

As shown in FIG. 5, in order to keep the error rate of a wireless signal at or below a particular threshold value, the C/N ratio must be of a level proportional to the magnitude of the modulation multivalue number of the modulation method of the wireless signal. In addition, adding an error correction code to the wireless signal enables a decrease of the C/N ratio at which the error bit rate is no greater than the threshold value.

For example, assuming that the C/N ratio is a switch value X when the modulation method of the data signal is switched from 16QAM to 64QAM, if the error correction code is not added to the pilot signal when the modulation method of the data signal is 16QAM, the C/N ratio may cause the error bit rate of the pilot signal to surpass the error bit rate of the data signal, whereby the reliability of the pilot signal cannot be maintained at a high level. Accordingly, in order to maintain the reliability of the pilot signal at a high level when the modulation method of the data signal is 16QAM, an error correction code of high redundancy must be added to the pilot signal.

On the other hand, when the modulation method of the data signal is 64QAM, the error bit rate of the pilot signal is extremely low regardless of whether an error correction code has been added to the pilot signal or not. Accordingly, the pilot signal can be obtained with sufficiently high reliability if an error correction code of low redundancy is added.

Accordingly, the reliability of the first pilot signal can be ensured even if the redundancy of the error correction code of the first pilot signal is decreased to the extent that the modulation multivalue number of the transmission modulation method is great.

Figure 6:
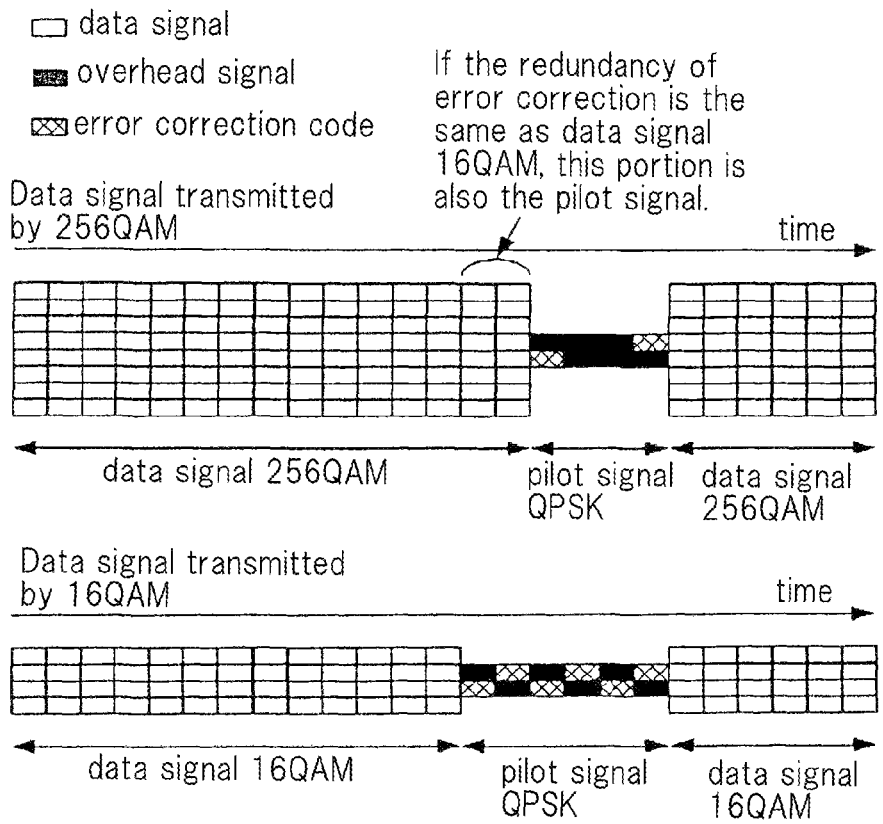
FIG. 6 shows an example of a transmitted frame signal.

If the redundancy of the error correction code of the first pilot signal is decreased to the extent that the modulation multivalue number of the transmission modulation method is great, the transmitted frame signal becomes a format such as shown in FIG. 6.

FIG. 6 shows the transmitted frame signal when the modulation method of the data signal is 256QAM and the modulation method of the data signal is 16QAM.

As shown in FIG. 6, when the modulation method of the data signal is 256QAM, the redundancy of the error correction code of the first pilot signal is smaller than when the modulation method of the data signal is 64QAM. As a result, the number of symbols of the first pilot signal can be decreased. Accordingly, because the number of symbols of the transmitted data signal can be increased to the extent of the decrease of the number of symbols of the first pilot signal, the transmission time of the transmitted data signal can be increased, and the transmission capacity of the transmitted data signal can be raised.

For example, when the modulation method of the transmitted data signal is 16QAM, the transmission time of the error correction code of the first pilot signal takes up 1% of the transmission time of the transmitted frame signal.

At this time, the modulation method of the transmitted data signal is switched to 256QAM and the redundancy of the error correction code of the first pilot signal is decreased, whereby the transmission time of the error correction code becomes just 0.1% of the transmission time of the transmitted frame signal. In this case, the portion of decrease of the transmission time of the error correction code, i.e., the 0.9% portion of the transmission time of the transmitted frame signal, can be used for the transmission of the data signal, whereby the transmission capacity of the data signal can be increased by the 0.9% portion.

The third exemplary embodiment is next described.

In the second exemplary embodiment, the modulation method of the pilot signal is fixed and the redundancy of the error correction code of the pilot signal is variable, but the present exemplary embodiment has the object of raising the transmission capacity of the data signal while maintaining the reliability of the pilot signal by fixing the redundancy of the error correction code of the pilot signal and making the modulation method of the pilot signal variable. The communication system of the present exemplary embodiment has the same configuration as the configuration shown in FIGS. 2 and 3.

In the present exemplary embodiment, error correction addition unit 52 of pilot signal generation unit 11 adds an error correction code of redundancy that is fixed in advance to the overhead signal. As a result, pilot signal extraction unit 26 does not need to report transmission modulation information to error correction addition unit 52.

In addition, modulation method control unit 13 determines the modulation method of the pilot signal according to the transmission modulation method that is indicated by the transmission modulation information that is received from pilot signal extraction unit 26.

More specifically, modulation method control unit 13 raises the modulation multivalue number of the modulation method of the pilot signal in proportion to the size of the modulation multivalue number of the transmission modulation method. Accordingly, pilot signal extraction unit 26, by reporting transmission modulation information to modulation method control unit 13, increases the modulation multivalue number of the modulation method of the pilot signal in proportion to the size of the modulation multivalue number of the transmission modulation method.

Modulation method control unit 13 dynamically sets the modulation method of the transmitted frame signal in demodulator 24 in accordance with the transmission modulation method such that the transmitted data signal in the transmitted frame signal is modulated by the transmission modulation method and the first pilot signal in the transmitted frame signal is modulated by the modulation method that was determined by modulation method control unit 13.

Figure 7:
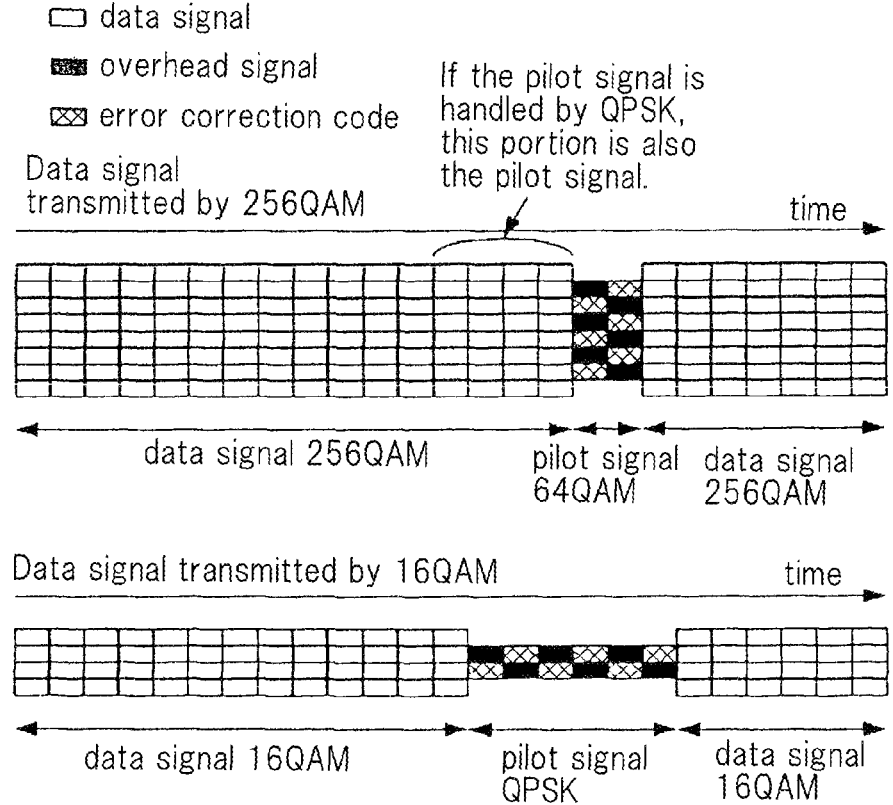
FIG. 7 shows another example of a transmitted frame signal.

For example, according to the above-described operations, the modulation method of the first pilot signal becomes 64QAM when the modulation method of modulating the transmitted data signal is 256QAM and becomes QPSK when the modulation method of modulating the transmitted data signal is 64QAM, as shown in FIG. 7.

In this case, when the modulation method of modulating the transmitted data signal is 256QAM, the amount of information that can be transmitted per single symbol of the first pilot signal is greater than when the modulation method of modulating the transmitted data signal is 64QAM. The reason for this difference is the magnitude of the modulation multivalue number of the modulation method of the first pilot signal.

Accordingly, when the modulation method of modulating the transmitted data signal is 256QAM, the number of symbols of the first pilot signal decreases compared to a case in which the modulation method of modulating the transmitted data signal is 64QAM, whereby the transmission time of the first pilot signal can be made shorter. As a result, the portion by which the number of symbols of the first pilot signal decreases can be used in the transmission of the transmitted data signal and the transmission capacity of the transmitted data signal can be increased.

The fourth exemplary embodiment is next described.

In the first to third exemplary embodiments, the reliability of the pilot signal is raised by making the modulation multivalue number of the modulation method of modulating the pilot signal smaller than the modulation multivalue number of the data signal, but in the present exemplary embodiment, the modulation methods of modulating each of the pilot signal and data signal are made the same and the redundancy of the pilot signal is raised with the object of both ensuring the reliability of the pilot signal and increasing the transmission capacity of the data signal. The communication system of the present exemplary embodiment has the same configuration as the configuration shown in FIGS. 2 and 3.

In the present exemplary embodiment, modulation method control unit 13 sets the transmission modulation method that is indicated in the transmission modulation information to modulator 14. In the present exemplary embodiment, the first pilot signal and transmitted data signal are modulated by the same modulation method, and modulation method control unit 13 therefore sets the transmission modulation method that is indicated by transmission modulation information in modulator 14. Accordingly, transmission circuit 10 modulates the first pilot signal by the transmission modulation method that is indicated by the second pilot signal.

In accordance with the transmission modulation method that is indicated by the transmission modulation information, error correction addition unit 52 of pilot signal generation unit 11 adds the error correction code to the overhead signal that is generated by OH generation unit 51 to generate a first pilot signal that has redundancy. At this time, error correction addition unit 52 increases the bit number of the error correction code in proportion to the size of the modulation multi-value number of the transmission modulation method and raises the redundancy of the error correction code of the first pilot signal, whereby pilot signal extraction unit 26, by reporting the transmission modulation information, raises the redundancy of the error correction code of the first pilot signal in proportion to the size of the modulation multivalue number of the transmission modulation method.

When the modulation multivalue number of the transmission modulation method becomes large and the error correction code of the pilot signal is fixed, the number of symbols of the pilot signal decreases. As a result, error correction addition unit 52 increases the redundancy of the error correction code of the first pilot signal within a range that is smaller than the bit number by this decreased number of symbols.

Transmission frame control unit 54 of coding unit 12 switches switch 53 such that the first pilot signal is inserted into the transmitted data signal. Decoding unit 25 may further measure the error bit rate of the transmitted frame signal for each bit of the transmitted frame signal, and transmission frame control unit 54 may insert the first pilot signal into bits in which the error bit rate is low. In this case, the redundancy of the error correction code that is necessary for maintaining reliability of the first pilot signal can be reduced, whereby the transmission capacity of the data signal can be increased.

Figure 8:
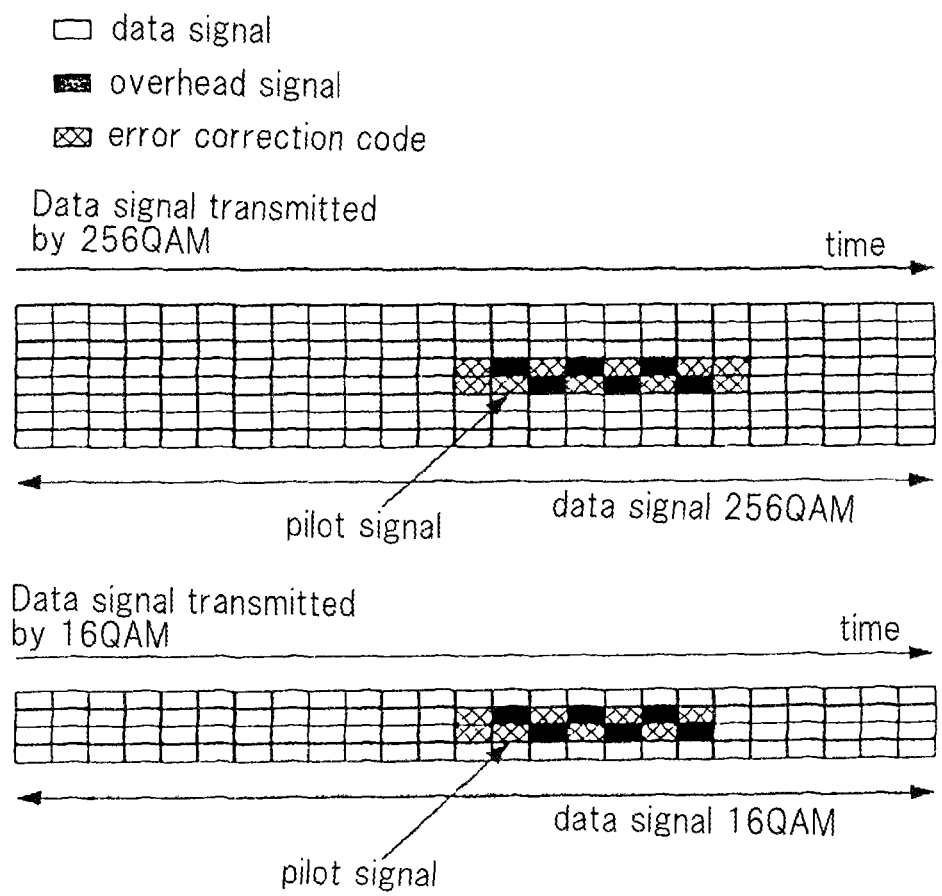
FIG. 8 shows another example of a transmitted frame signal.

According to the configuration described above, the first pilot signal is inserted into the transmitted data signal as shown in FIG. 8. Thus, when the state of the transmission line is good, not only the data signal but the pilot signal as well can be modulated by a modulation method in which the modulation multivalue number is high and then transmitted, whereby the transmission capacity of the data signal can be increases.

Although the invention of the present application has been described hereinabove with reference to exemplary embodiments, the invention of the present application is not limited to the above-described exemplary embodiments. The configuration and details of the invention of the present application is open to various modifications within the scope of the invention of the present application that will be clear to one of ordinary skill in the art.

This application claims the benefits of priority based on Japanese Patent Application No. 2009-292528 for which application was submitted on Dec. 24, 2009 and incorporates by citation all of the disclosures of that application.

What is claimed is:

1. A wireless communication device that uses an adaptive modulation method that switches the modulation method of a data signal according to the state of a transmission line to carry out wireless communication, comprising:
    a determination unit that, according to the state of the transmission line, determines the reception modulation method that is the modulation method of modulating a received data signal that is received from another wireless communication device;
    a transmission unit that generates a first pilot signal that indicates the reception modulation method that was determined in said determination unit, and that, after adding an error correction code, modulates and then transmits the first pilot signal;
    a reception unit that receives a second pilot signal that indicates the transmission modulation method that is the modulation method of modulating the transmitted data signal that is transmitted to another wireless communication device; and a switching unit that, according to the transmission modulation method indicated by the second pilot signal that was received by the reception unit, switches at least one of the modulation method of the first pilot signal that was transmitted by said transmission unit and redundancy of the error correction code of the first pilot signal.

2. The wireless communication device as set forth in claim 1, wherein said switching unit lowers said redundancy in proportion to the size of a modulation multivalue number of said transmission modulation method.

3. A wireless communication system that is provided with a plurality of the wireless communication devices as set forth in claim 2 and that switches the modulation method used in communication between the wireless communication devices according to the state of the transmission line between said wireless communication devices.

4. The wireless communication device as set forth in claim 1, wherein said switching unit increases the modulation multivalue number of the modulation method of said first pilot signal in proportion to the size of the modulation multivalue number of said transmission modulation method.

5. A wireless communication system that is provided with a plurality of the wireless communication devices as set forth in claim 4 and that switches the modulation method used in communication between the wireless communication devices according to the state of the transmission line between said wireless communication devices.

6. The wireless communication device as set forth in claim 1, wherein:
    said transmission unit modulates said first pilot signal by a transmission modulation method that is indicated by a second pilot signal that is received by said reception unit; and
    said switching unit raises said redundancy in proportion to the size of the modulation multivalue number of said transmission modulation method.

7. A wireless communication system that is provided with a plurality of the wireless communication devices as set forth in claim 6 and that switches the modulation method used in communication between the wireless communication devices according to the state of the transmission line between said wireless communication devices.

8. A wireless communication system that is provided with a plurality of the wireless communication devices as set forth in claim 1 and that switches the modulation method used in communication between the wireless communication devices according to the state of the transmission line between said wireless communication devices.

9. The wireless communication system as set forth in claim 8, wherein, in communication between said wireless communication devices, a modulation method of modulating a signal that is transmitted from one wireless communication device to another wireless communication device and a modulation method of modulating a signal that is transmitted from said other wireless communication device to said one wireless communication device are independently switched.

10. A wireless communication method that is realized by a wireless communication device that uses an adaptive modulation method that switches the modulation method of modulating a data signal according to the state of a transmission line to carry out wireless communication, comprising:
   according to the state of said transmission line, determining the reception modulation method that is the modulation method of modulating a received data signal that is received from another wireless communication device;
   generating a first pilot signal that indicates said reception modulation method that was determined, and, after first adding an error correction code, modulating and then transmitting the first pilot signal;
   receiving a second pilot signal that indicates the transmission modulation method that is the modulation method of the transmitted data signal that is transmitted to another wireless communication device; and
   according to the transmission modulation method that is indicated by said second pilot signal that was received, switching at least one of the modulation method of said first pilot signal and redundancy of the error correction code of the first pilot signal.

11. The wireless communication method as set forth in claim 10, wherein, in said switching, said redundancy is decreased in proportion to the size of the modulation multivalue number of said transmission modulation method.

12. The wireless communication method as set forth in claim 10, wherein, in said switching, the modulation multivalue number of the modulation method of modulating said first pilot signal is increased in proportion to the size of the modulation multivalue number of said transmission modulation method.

13. The wireless communication method as set forth in claim 10, wherein:
   in said generating, said first pilot signal is modulated by the transmission modulation method that is indicated by said second pilot signal that is received; and
   in said switching, said redundancy is raised in proportion to the size of the modulation multivalue number of said transmission modulation method.

* * * * *